US008622540B2

(12) United States Patent
Burnstein (10) Patent No.: US 8,622,540 B2
(45) Date of Patent: *Jan. 7, 2014

(54) PERSONALIZEABLE DISPLAY FRAMES (76) Inventor: Tracey E. Burnstein, Bloomfield Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,911

(22) Filed: Jun. 15, 2012

(65) Prior Publication Data
US 2012/0249946 A1 Oct. 4, 2012

Related U.S. Application Data (63) Continuation of application No. 12/254,923, filed on Oct. 21, 2008, now abandoned, which is a continuation-in-part of application No. 11/858,121, filed on Sep. 20, 2007, now abandoned, which is a continuation-in-part of application No. 11/773,306, filed on Jul. 3, 2007, now Pat. No. 7,588,331.

(51) Int. Cl.
G02C 11/02 (2006.01)

(52) U.S. Cl.
CPC .................................. G02C 11/02 (2013.01)
USPC .............. 351/52; 351/116; 351/121; 351/140

(58) Field of Classification Search
CPC ....................................................... G02C 11/02
USPC .............. 351/41, 51, 52, 111, 116, 119, 121, 351/140, 158
See application file for complete search history.

(56) References Cited

U.S. PATENT DOCUMENTS 5,000,558 A * 3/1991 Blackstone ...................... 351/41
6,641,260 B1 * 11/2003 Avital ............................. 351/41
7,901,070 B2 * 3/2011 Burnstein ....................... 351/51

FOREIGN PATENT DOCUMENTS

FR 2576117 * 1/1985 ...................... 351/51

* cited by examiner

Primary Examiner — Huy K Mai
(74) Attorney, Agent, or Firm — John A. Artz; Dickinson Wright PLLC (57) ABSTRACT Eyeglass frame member which can be individualized and/or accessorized according to user's moods or desires, or according to display indicia displayed in the frames or new temples of different shapes or colors. Decorative or personalized pin members can be positioned in openings in the display frames or temple members. Mating connecting members can be used to selectively disconnect and change the temple members relative to the frame member.

14 Claims, 8 Drawing Sheets

ABLE DISPLAY FRAMES

CROSS REFERENCE TO RELATED APPLICATIONS

This is a continuation of U.S. patent application Ser. No. 12/254,923, filed on Oct. 21, 2008 now abandoned, which is a continuation-in-part of U.S. patent application Ser. No. 11/858,121, filed on Sep. 20, 2007 now abandoned, which in turn is a continuation-in-part of U.S. patent application Ser. No. 11/773,306 filed on Jul. 3, 2007 now U.S. Pat. No. 7,588,331.

TECHNICAL FIELD

The present invention relates to personal items, such as glasses, hats, and the like, which can be worn or displayed and which have means for being decorated (i.e. personalized) according to one's personal taste.

BACKGROUND OF THE INVENTION

There are a variety of wearable and displayable products on the market which individuals make or purchase and which are selected at least in part due to their style and/or visible effect. These products include wearable items such as hats, gloves, glasses, shirts, shoes, jackets and other items of clothing. These products also include products purchased or acquired primarily for display purposes but which also have utility and are put into use by the purchaser. These products include wall hangings, pottery, accessories and the like.

Most of these items, however, have their individual aesthetics and style as purchased, that is, the products are made or manufactured to have a certain look or style, and to provide a certain visual effect. It is uncommon to provide products or other items which can be easily changed by the user to either personalize them or change their visual effect to fit a certain or changed mood or "style moment."

One product currently on the market which allows the purchaser to individualize them and change their looks or visual appearance are the Croc shoes. These products can be individualized with Jibbitz accessories, which are popular today.

It is an object of the present invention to provide numerous unique products which can be worn or displayed and which can be individualized as desired by the wearer or owner. It is another object of the present invention to provide products which have utility and also which can be visually changed as needed or desired to provide different visual effects.

SUMMARY OF THE INVENTION

The present invention provide a unique series of products which are wearable, or displayable, or both, and which can have their visual effect and aesthetics easily changed or altered to fit the user (owner's) style and/or mood. One product comprises a pair of glasses which have a plurality of holes or sites in which decorative-type accessories can be affixed. The glasses preferably are made of a soft material and are anti-microbial. The decorative-type accessories comprise pin members, which are positioned in the holes or attached to the sites. The pin members can have any individual type of decorative head member thereon which can be colorful or have a logo, initial, etc. that the wearer wants to display. The head member can also be a precious or semi-precious stone.

Pin members can also be used to hold the temple members to the frames in pairs of glasses.

The present invention also includes wearable products such as headbands, visors, hats, belts, animal collars and the like. The present invention also includes utilitarian personalizable display products such as children's growth charts, flower pot and/or covers, toothbrushes, hairbrushes, luggage tags, school supplies, memorabilia, and the like.

The various products may have holes strategically manufactured and positioned, or that allow the wearer to create the holes on his/her own. This allows the end users/consumers to personalize and individualize their look at any given moment of any given day.

Also in accordance with an embodiment of the present invention, color changeable materials, such as thermochromic and photochromic materials, or thermal paints, can be added to the products or the pin members, either as they are being made or afterwards in order to allow the wearer to personalize or individualize them. These materials are sensitive to UV light and/or heat and change colors when exposed to light or heat.

One of the main purposes of the invention is to allow the needs, desires, or creativity of the end user/consumer to be expressed. That expression allows for the re-use/interchangeability of pin members, for the updating of looks, for information dissemination and recyclability of products, and ultimately, for the preservation of the Earth.

The present invention also facilitates the desire for learning, and the engaging and expansion of ideas. One such example is the creation of 3D educational tools, such as maps containing geographical terrain that can now be viewed in 3D capacity and used in schools around the world. The pin members allow the decorated design supporting the graphic to be held in place until popped out and maybe re-inserted at a later date. This allows for an exchange of ideas and factual information for purposes of education, conferences, mapping, strategic planning, and the like. It also allows teachers to use pin members for their students all year long by way of inserting initials, symbols or written names (depending on how elaborate or how many holes or pin members one chooses to use). Events, tests and achievements can now be tracked in 3D format. At the end of their instructions and uses, the pin members can be popped out and re-inserted in a different way, for different purposes and for different looks for the next class, term or year. With the invention, interchanges between parent/child, educator/student, professional to professional, and manager to underling can be facilitated. The consumer can become an advertisement for corporate branding or information dissemination and yet the vehicle can be revised from the beginning (i.e. the pin members on a hat with a symbol, logo or words can be popped out re-inserted and therefore re-used).

Some of the items in and on which the current invention can be used (but not limited to) include: hats, sweatbands, sun visors, growth charts, rulers, dog/pet collars, toothbrushes, hairbrushes, combs, watch bands, belts, luggage straps, name tags, baggage tags, personal identification tags, game boards, travel game boards, educational devices, business devices, information storage boxes, notebooks and items that are wearable and/or displayable whereby the end user or consumer can chose to identify, educate, decorate, design or disseminate a message publicly and which, if the consumer chooses to do so, can also be done simultaneously on the same vehicle with other known methods (one such example is a baseball hat with or without a corporate logo and with one or more holes for insertion of some type of pin member).

Other benefits and features of the present invention will become apparent when viewed in accordance with the following description and drawings, as well as the appended claims.

DESCRIPTION OF PREFERRED EMBODIMENTS

Although the present invention is described herein with specific reference to particular wearable and displayable items, it is to be understood that the present invention has applicability to a wide variety of wearable and displayable products, including any that would be apparent to persons of ordinary skill in the art upon review of the present description and drawings.

The materials used for the products in accordance with the present invention are preferably elastomer or soft polymer products. They should be relatively rubbery, light in weight and have elastic characteristics. They also should resist low and medium temperatures, as well as atmospheric elements and chemicals. Representative materials include closed-cell resin-based foam-like materials such as those used in the Crocs, Inc. shoe product. Crocs, Inc. describes one of its materials as an "ethylene vinyl acetate copolymer-based material", such as that sold commercially as Levirex and marketed by Finproject of Italy.

Also, the preferred material for the wearable and displayable items described herein is a soft elastomeric material, particularly one which would act to hold pin members in place when inserted through a hole in the material. It is also preferred that the material be a material which allows the product to float if dropped in a lake or other body of water, and which is anti-microbial. It is to be understood, of course, that other materials can be utilized for the products in accordance with the present invention, these other materials being anything that would be apparent to persons of ordinary skill in the art, or which are in common use for other models of the particular products discussed herein, such as leather, cloth materials, etc. In addition, the products may instead be made from a harder plastic material, e.g. in order to more securely hold semi-precious stones and other jewels.

Figure 1:
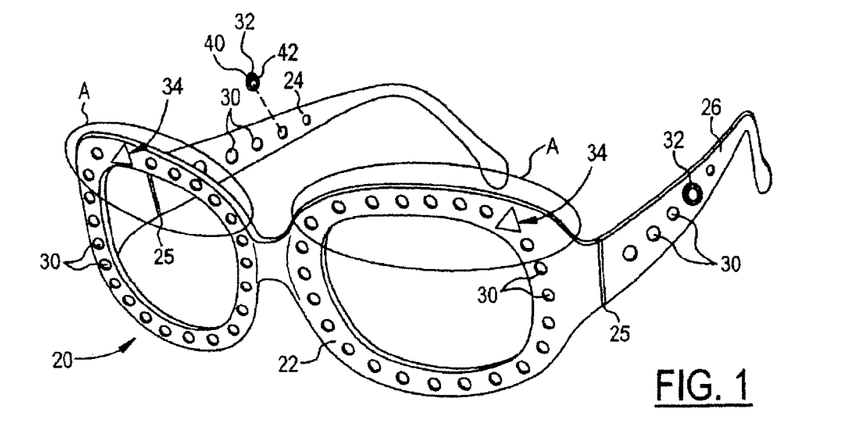
FIG. 1 illustrates one embodiment of the present invention.

FIG. 1 schematically depicts a pair of glasses 20 in accordance with the present invention. The glasses have a front frame member 22 and a pair of ear piece members 24 and 26. Each of the members 22, 24 and 26 have a plurality of openings or holes 30 for placement of decorative pin members, a few of which 32, 34 are shown.

The glasses 20 preferably have "living hinge" connections 25 or a crimp between the front frame member 22 and the ear piece members 24 and 26. Preferably a natural fold is provided between the frame member and the temple members in order for the temples to be folded co-planar with the frame for transport and storage.

The pin members have a decorative head member 40, a shaft member 42, and a retainer member 44. The shaft member is adapted to be pushed into a hole 30 and held in place by positioning the retainer member 44 on the opposite side of the head member. The shaft member can also have threads thereon and be screwed into the holes, or have a nut to hold it securely in place.

For convenience, but not by way of limitation, these members will be referred to by the same term "pin members". The pin members can have a wide variety of sizes and shapes so long as they are usable in accordance with the features and benefits of the present invention.

Figure 3:
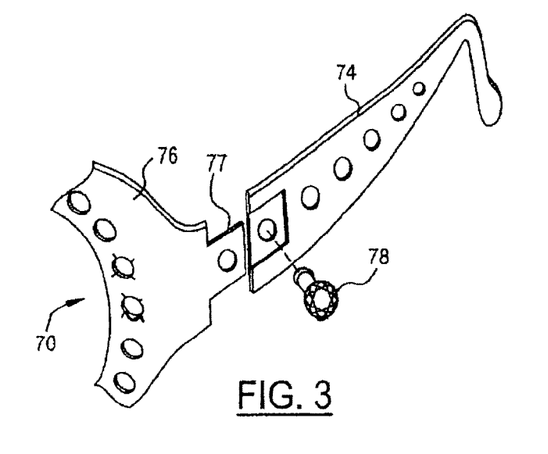
FIG. 3 is a close-up of a portion of the embodiment depicted in FIG. 2.

In order to assist in inserting the decorative pin members in the holes 30, small slits or slots 46 can be provided, as shown in FIG. 3. The pin members are preferably held in place simply from the push lock.

Figure 4:
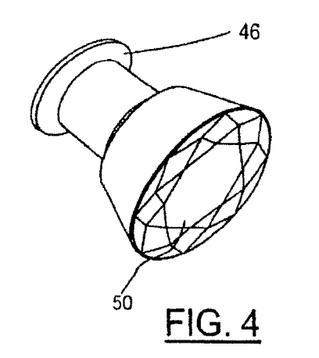
FIG. 4 is an embodiment of a pin member in accordance with the present invention.

The head members 40 can have any size, shape, color or decoration that appeals to the wearer. The head member and the pin members shown in FIG. 1 have circular or triangular shapes. It is also possible to affix jewels or other precious or semi-precious stones on the head members, such as a diamond 50 shown in FIG. 4. Small screws can be inserted into the base of a diamond stud if necessary.

The size and number of holes in the front frame members and ear piece members is a matter of choice. It is also possible to only provide holes in areas A in FIG. 1, rather than around the entire perimeter of the front frame member.

Figure 9:
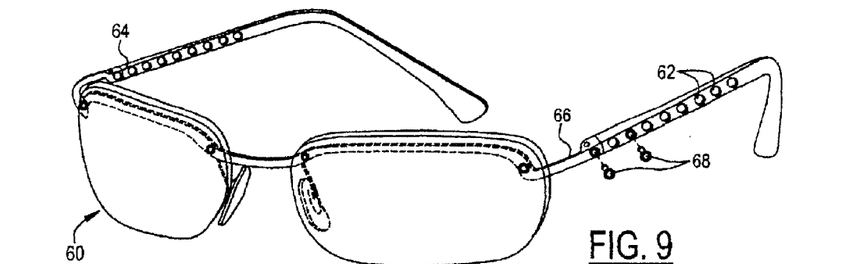
FIG. 9 illustrates still another embodiment of the present invention.

The present invention also can be utilized with rimless glasses. This is shown in FIG. 9. The glasses 60 have holes or openings 62 only in the two ear piece members 64 and 66. Pin members 68 can be positioned in all or none of the holes 62.

Figure 2:
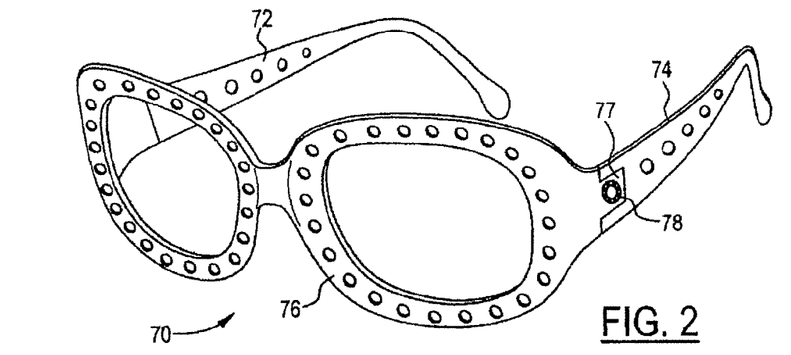
FIG. 2 illustrates another embodiment of the present invention.

FIGS. 2 and 3 schematically depict another embodiment of the invention. In this pair of glasses 70, the ear piece members 72 and 74 are attached to the front frame member 76 by one of the pin members 78. The front frame member 76 has flap members 77 which mate with recesses 79 in the ear piece members.

Figure 12:
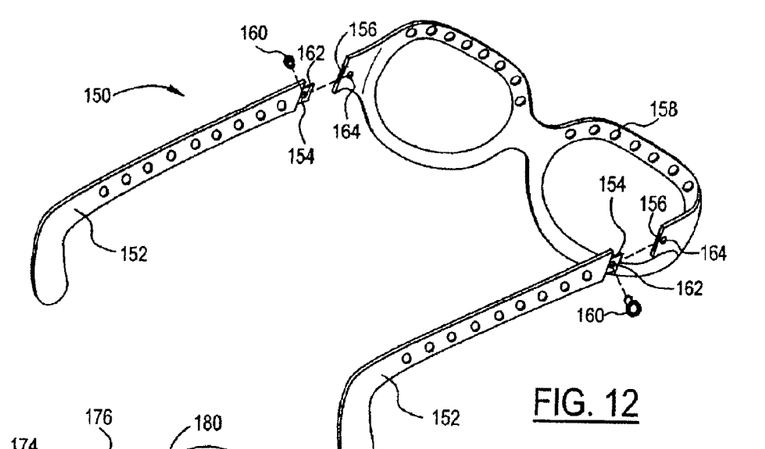
FIGS. 12 and 13 illustrate additional embodiments of the present invention when used with glasses.

In another embodiment 150 as shown in FIG. 12, the two temple members 152 are the same. The temple members 152 have prongs or male members 154 which can be inserted into slots 156 in the front frame member 158. The temple members are held in place by pin members 160 which are inserted through aligned openings 162, 164 in the temple member and frame member.

With the use of "universal" or interchangeable temple members, the wearer has more choices to individualize his/her glasses. For example, the temples can be different colors or have different shapes and designs. By "interchangeable", it is also meant that the same temple member could be used on either side of the frame member.

Figure 13:
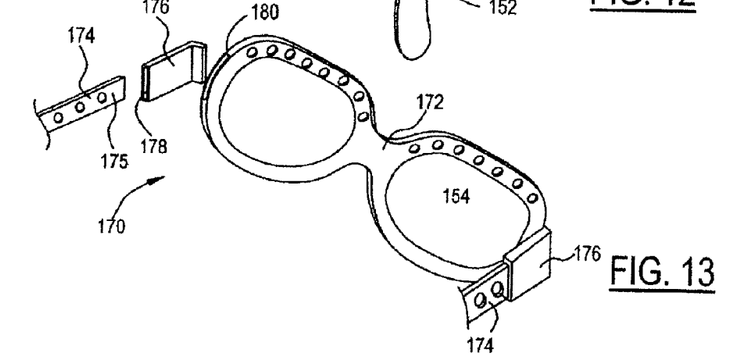

Also, as shown in embodiment 170 in FIG. 13, the frame member 172 can be attached to the temple members 174 by separate connector members 176. The ends 175 of the temple members fit within sockets 178 in the connector members 176, and the connector members in turn are held in place by being inserted in slots 180 in the frame member 172. Again, with this embodiment, the two temple members are interchangeable and the glasses can be personalized and individualized with temple members having different colors and/or shapes.

Figures 14, 15:
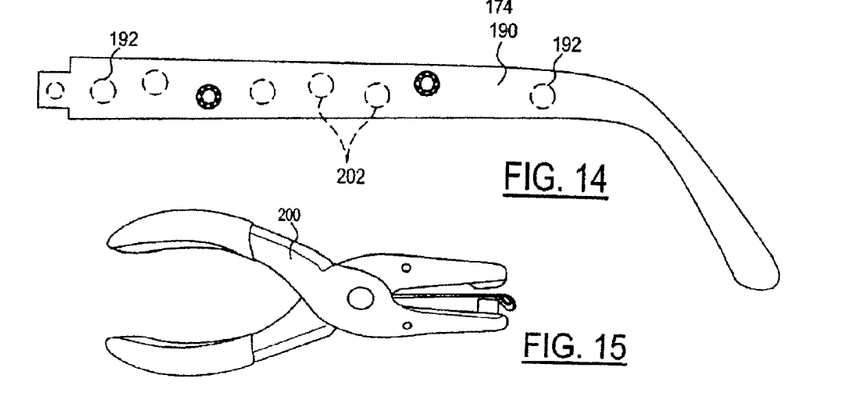
FIGS. 14 and 15 illustrate another embodiment of the present invention wherein a hole punch can be used to individualize a product.

In still another embodiment as shown in FIG. 14, the product, such as a frame member or temple member 190, can be provided without any holes 192 or with a minimum number of holes. In this manner, the wearer can use a hole-making tool, such as a hole punch 200 depicted in FIG. 15, and select and make the number of holes and in a unique pattern or arrangement. For example, sites 202 could be utilized for additional holes 192.

Figure 16:
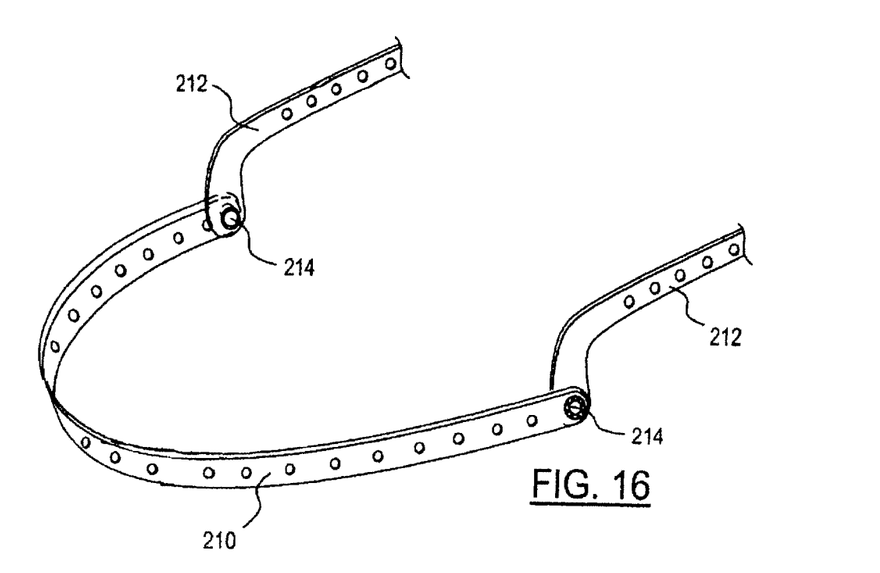
FIGS. 16 and 17 illustrate embodiments of the present invention which utilize straps to hold pairs of glasses on wearer's heads.

In order to hold the glasses more firmly on the head of the wearer, a strap member 210 can be provided. This is shown in FIG. 16. The strap member can be attached to the ends of the temple members 212 with a pin member 214. If a heel strap from a Crocs shoe is utilized as the glasses strap, and if it is too short to extend across the back of the wearer's head, then a pair of straps can be attached together with a pin member and used in this manner.

Figure 17:
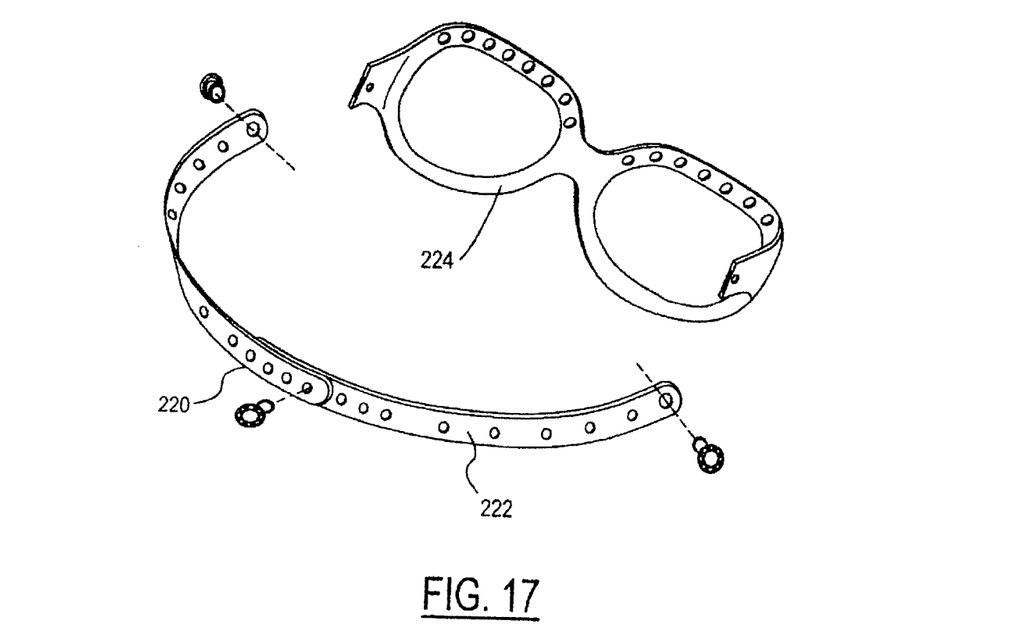

Also, as shown in FIG. 17, a one or two-piece strap member 220, 222 can be attached directly to a frame member 224. This embodiment can be used with children, for example, where temple members are not comfortable or practical.

Where a single strap is utilized, it can be cut to length and a new hole formed for the pin member. Similarly, if two straps need to be utilized, one or both can be cut to form a strap of the requisite length. Where the two straps meet and are fastened together, the mating end portions can be crimped to seal the edges if necessary and to facilitate the overlapping relationship. Also, with two straps, the straps can be provided of different sizes or colors in order to add individuality to the glasses.

The possibilities for the sizes, shapes, types and colors of pin connector members which can be used with the present invention are limitless. Kits of pin connector members can be provided for special occasions, holidays, political parties, etc.

One of the aspects or embodiments of the present invention relates to kits, kits of products or pieces, and with a plurality of pin members. One kit, for example, can include a frame member, a pair of interchangeable temple members, and a plurality of different pin members. Additional temple members and pin members could be marketed and purchased separately. The temple members and pin members could also be traded among wearers. Another kit could include the same pieces but without any holes, and instead include a hole punch.

Figure 5:
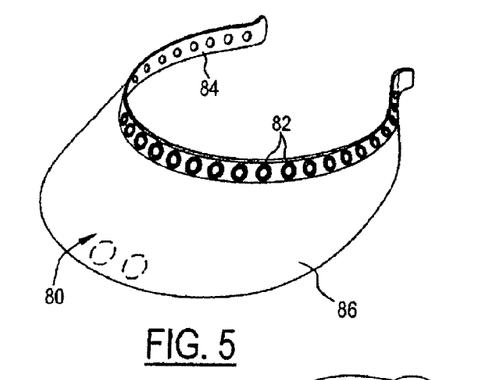
FIGS. 5-8 depict additional embodiments of the present invention.

FIGS. 5-8 depict other embodiments of the present invention. FIG. 5 illustrates a visor 80 which has a plurality of holes or openings 82 along the band 84. The wearer can place pin members in one or more of the holes to individualize and accessorize the visor. It is also possible to include additional holes or openings 80 on the bill 86 of the visor, similar to the situation shown in FIG. 7.

Figure 6:
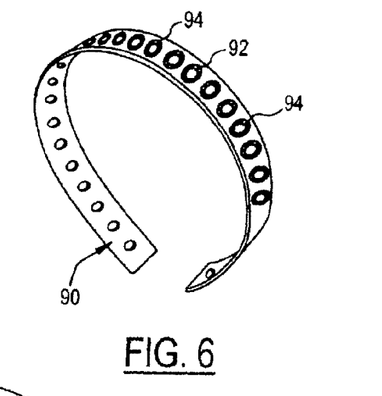

FIG. 6 illustrates a headband 90 with a plurality of holes or openings 92 in it. The holes or openings 92 can extend the entire length of the headband as shown, or be positioned only at pre-selected portions thereof. Also, the headband 90 as shown has a C-shape and preferably has a "springiness" to it to help hold it in place on the head of the wearer. It is also possible, however, for the headband structure to extend in a complete circle. In the latter case, it is preferable that the headband material have some stretch or resiliency to it so it can be easily positioned on the head of the wear and will stay in place during use. As with the other embodiments of the invention, decorative pin members 94 can be positioned in the holes or openings 92 in order to individualize the headband.

Figure 8:
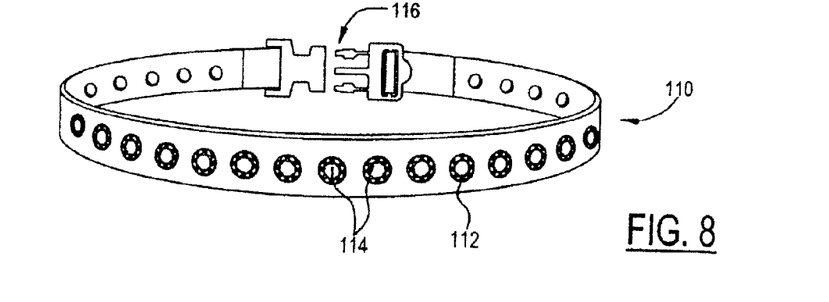

The headband can also be a sweatband preferably having a cover made from an absorbent material. If the headband is not extendable, then a latching mechanism, such as are shown in FIG. 8, can be utilized. Overlapping end members having Velcro fasteners on them can also be utilized to hold the headband/sweatband in a circular shape on the head of the wearer. Holes or openings for pin members can be provided at certain positions or locations on the headband, or provided throughout the entire length of the headband.

The present invention also allows updating of information or design elements on the products. In addition, the end user and/or owner could display any type of desired information.

Figure 7:
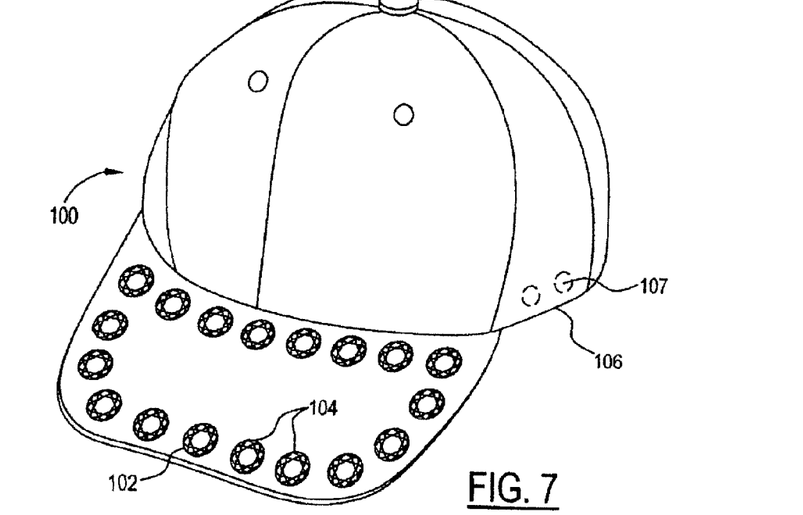

FIG. 7 depicts a hat or cap 100 which has a plurality of holes or openings 102 on the brim (or "bill") 105 of the cap. In the cap shown, each of the holes or openings is filled with a jewel-type pin member 104. It is also possible to have additional holes or openings at other areas on the cap, such as holes 107 along the rim 106 or adjacent to the rim, which provide sites or additional pin members.

FIG. 8 shows a belt or a dog collar 110 with a series of holes or openings 112, each filled with a pin member 114. The belt/collar can use a snap closer 116 to keep it in place when it is being worn. If desired, one or more of the pin members could contain the address or telephone number of the dog's owner in case the dog became lost.

Figures 10, 11:
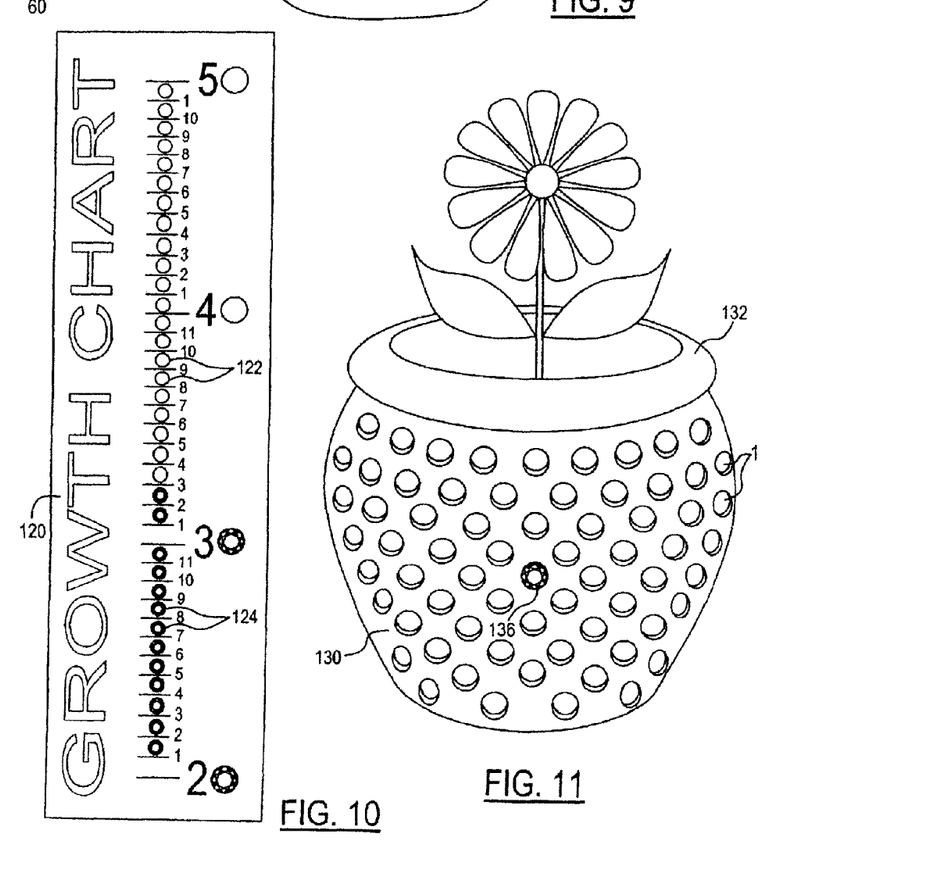
FIGS. 10 and 11 illustrate the use of the present invention on non-wearable products.

FIGS. 10 and 11 depict non-wearable embodiments of the invention which are used to display pin members in a useful or decorative manner. These embodiments are only exemplary of the numerous non-wearable products in which the present invention can be utilized. Other non-wearable products include, for example, key chains, pencil holders, and notebooks.

FIG. 10 depicts a children's growth chart 120. The chart has holes or openings 122 spaced every inch apart. As the child grows, an additional pin member 124 can be positioned at the appropriate height. In the example shown, the child is 3 feet 2 inches in height (38 inches).

FIG. 11 depicts a cover member 130 for a flower pot 132 or the like. The cover member 130 has a plurality of holes or openings 134 in which pin member 136 can be positioned. The cover member 130 can have holes or openings over its entire surface (as shown), or the holes or openings can be positioned only in certain areas or in certain patterns (such as stripes or a design).

Figures 18, 19:
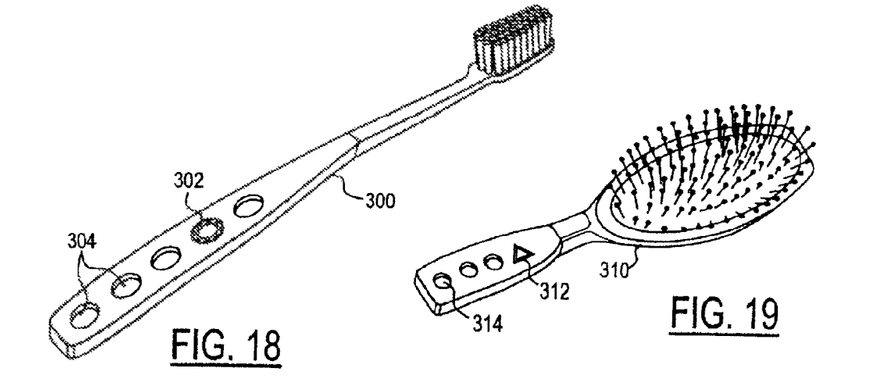
FIGS. 18-28 illustrate still further products showing examples of products in accordance with the present invention.
Figures 20, 21, 22, 23:
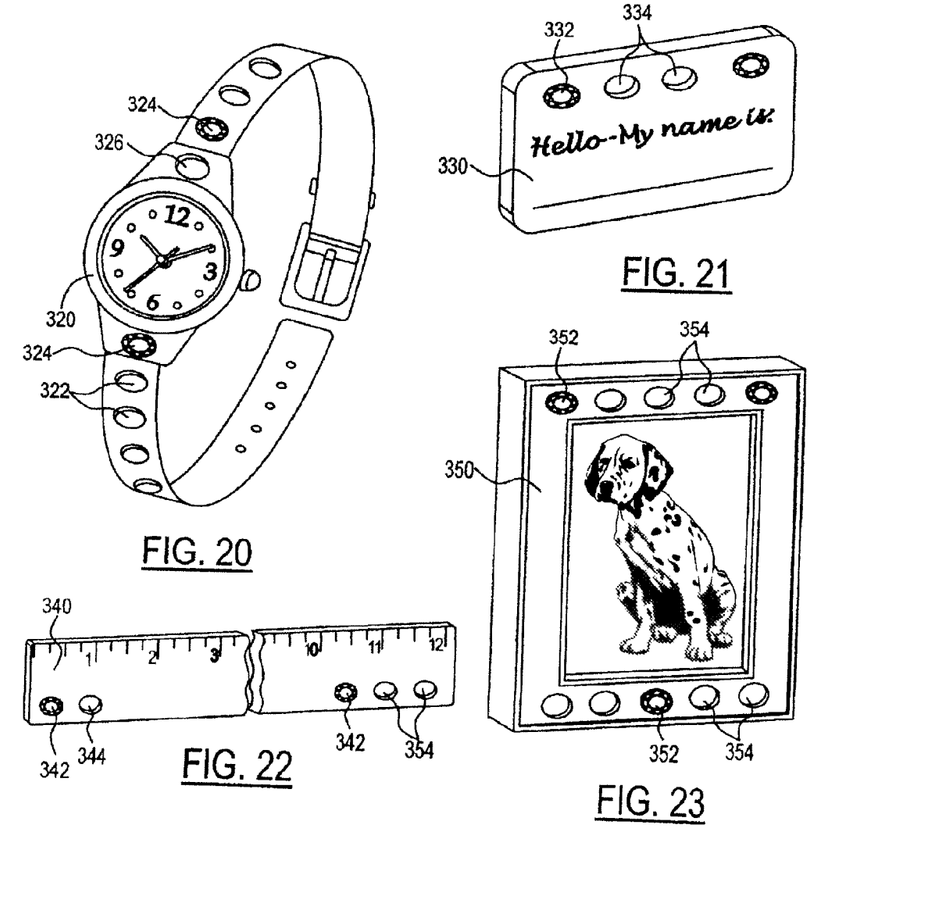
Figure 24:
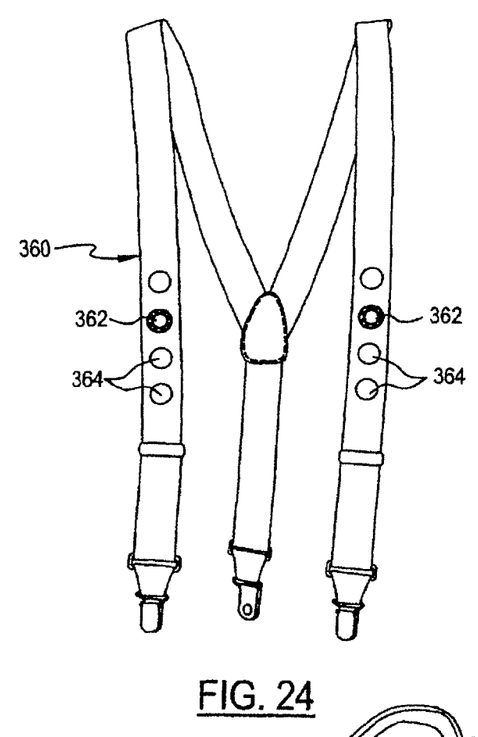
Figure 25:
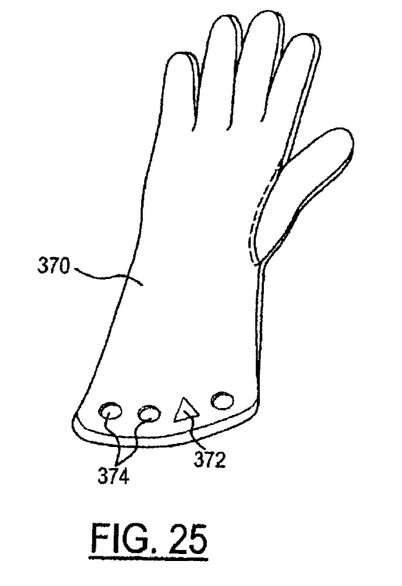
Figure 26:
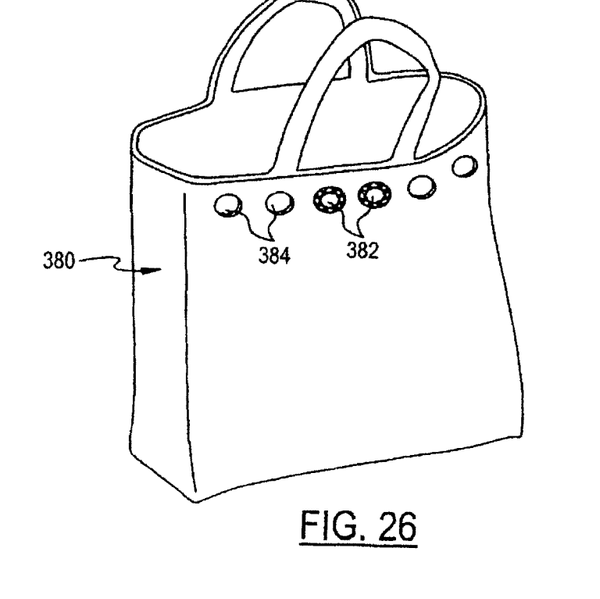

Still additional products can be provided and individualized in accordance with the present invention. These products include toothbrushes 300 decorated by pin member 302 in holes 304 as shown in FIG. 18, hairbrushes 310 decorated by pin members 312 in holes or openings 314 as shown in FIG. 19, or watches 320 decorated by pin members 322 in holes 324 in the watchband or holes 326 in the watch member itself, as shown in FIG. 20. Other products which can be similarly individualized and embellished include cosmetic-type kits, luggage tags, name tags 330 (FIG. 21), school supplies, notebooks, rulers 340 (FIG. 22), picture frames 350 (FIG. 23), time capsules, memorabilia-type kits, combs, office supplies, suitcase straps, suspenders 360 (FIG. 24), lamps, gloves 320 (FIG. 25), carrying bags 380 (FIG. 26), gift bags, pillows, handkerchiefs, cigarette cases, decorative boxes, wall hangings, and the like. The types of products with which the present invention can be utilized are virtually endless.

The present invention also can be used relative to various games and game boards, such as travel games. Board games with movable playing pieces are difficult to use in situations where the base is not stable, such as moving vehicles, or where environmental conditions are involved, such as outside in windy conditions or in swimming pools.

Figure 27:
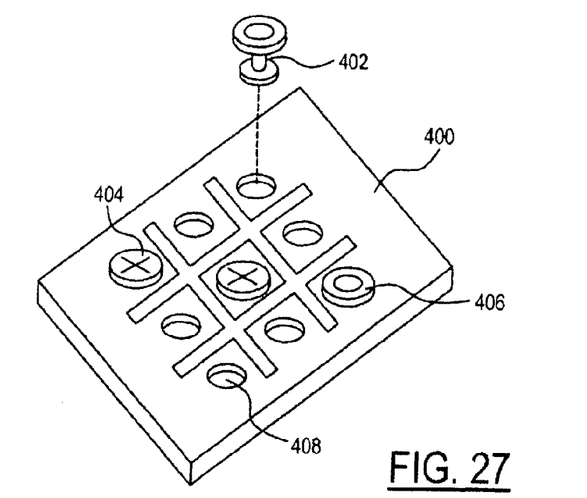

Game boards for games such as tic tac toe, scrabble, chess, checkers and the like are made from the same or similar material as the other products identified above. The material is a plastic foam material which is lightweight, waterproof and is light enough to float in water. The material also preferably is supplied with openings for the pin members, or it can be supplied with a hole punch, such as shown in FIG. 15, for making the holes where desired or needed. The pin members which are supplied with head members usable with the rules and objects of the game. For example, with a tic tac toe game 400, as shown in FIG. 27, the heads of the pin members 402 are marked either with a "x" or an "o", 404, 406. The pin members are inserted into holes or openings 408 in the game board 400.

With other games, the heads of the pin members can be provided with alphabet letters (scrabble), certain colors (checkers), or pictures of objects (chess).

It is also possible to provide a crossword puzzle board with pin members having alphabet letters on them. Different sets of word clues can then be provided for the board.

Figure 28:
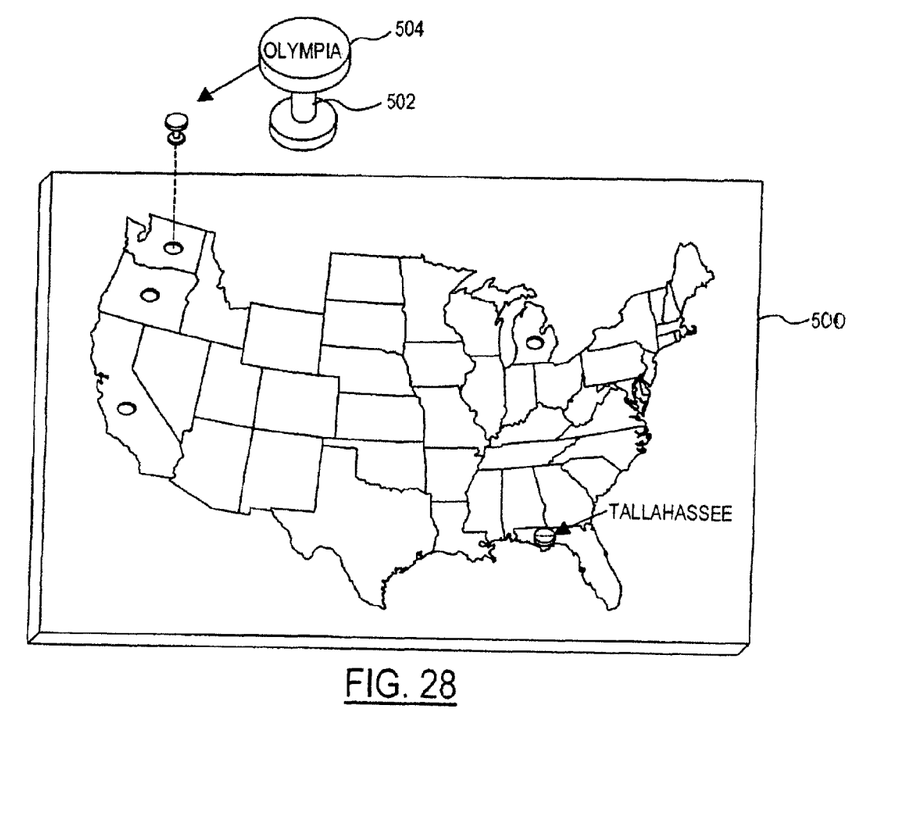

Educational work or game boards made of the same or similar materials can also be provided in accordance with the present invention. The boards can have openings or holes as prespecified locations for mounting of pin members with certain head designs. For example, educational boards having mathematical equations or problems, geometric shapes, geography themes, marine life themes, solar systems, etc. can be provided. For example, with a geography theme utilizing a map of the United States 400 as shown in FIG. 28, the pin members 502 can have state capital names on the heads 504 in order to teach the user the names and spelling of the capital cities.

For the teachings of geometric shapes, the names or shapes can be provided on the heads of the pins. For mathematical equations or problems, the numbers and mathematical systems can be shown on the heads of the pin members. Similarly, for marine life themes, the names or pictures of the various marine mammals, fish and other creatures can be provided on the heads.

The game boards can also be provided or packaged with other products made in accordance with the present invention, such as sunglasses, hats, sun visors, and the like.

The addition of UV sensitive materials to the product can add numerous benefits and special effects to the present invention. For example, the addition of thermochromic and photochromic materials, such as dyes or inks, to the materials allows the products to change color when exposed to light or heat, or a combination of both, such as sunlight. This creates additional individual personalization of the products for the users.

The range of colors is unlimited and can include virtually all colors of the rainbow, as well as shades and hues, and combinations thereof.

The UV sensitive materials, such as photochromic inks and pigmentation, can be added to the materials as they are made, or to the ingredients as they are being made, particularly in one of the last steps or processing procedures. The temperature or light sensitive materials could also be impregnated into the product materials after they are finished. In this manner, the additional materials which allow the products to change color are embedded in the matrix of the material from which the products are made. This prevents the thermochromic or photochromic materials from being chipped, peeled, rubbed or otherwise unintentionally removed from the surface of the product creating a void or blank area without the ability to change color.

On the other hand, in an alternate embodiment, the thermochromic or photochromic materials could be applied to the surface of the products and have the same appealing color-change affect. The materials could be applied in any conventional manner, such as being painted or sprayed on the exterior surface, or being applied as a thin film on the exterior of the product. The paints or inks could also be printed at particular locations on the products, either when they are finished or during manufacture. Paints which are temperature sensitive are also called "thermal paints."

With this alternate embodiment, it is also possible to provide kits for the owners to the products to create their own color-changeable product, or one with a particular design or logo that also changes colors when subjected to light or heat. The kits would include a can or bottle of a thermal paint or other thermochromic or photochromic material so that it could be applied on one or more products in accordance with the present invention. This would provide additional personalization and individuality for the owner or user of the product.

The color changeable material could also be applied to some or all of the pin members (or the heads of the pin members) in accordance with the present invention. In this manner, the pin members would change color when exposed to light or heat, or both, and create additional individual and aesthetic results.

In this manner, products used for outdoor activities, such as recreational activities, sportswear, gardening, sun wear, and the like can change their look and effect once they are exposed to the light or heat, or both. These products can include, for example, shoes, picture frames, art frames, dog collars, bracelets, sports accessories, shoelaces, hats and other head wear, school supplies, outdoor games (such as checkers), book covers, writing instruments, carrying cases, sports equipment, personal folders and planners, toys and outdoor recreational equipment.

The surface on which the UV sensitive materials are located can be virtually any size or shape. It can be small enough to create a functional or aesthetic accent effect, or large enough to encompass the entire items. It is also possible to locate different colors at different positions on the products, or form shapes, names, letters, or virtually any pattern or shape of different color or colors for effect.

Another embodiment of the invention includes small powerful magnets in each of the products, pin members, game pieces and the like. The magnets allow the user to attach the product to any metal surface, particularly ferrous metal surfaces. This would be particularly useful for games used outdoors or while traveling, and would keep the game pieces in place until intentionally moved by the player.

The products with magnets in them could also be made from a UV sensitive material, or have such a material be painted or sprayed on it, or molded in it. In this manner, the product could also change colors when subjected to heat and/or light.

Another embodiment of the present invention could be used to protect art work or valuable sculptures or printings from sun or light damage. The product (with or without a magnet) would have light or heat sensitive properties in the manner set forth above and by changing color, could be used as a warning indicator that the art work, etc. was being exposed to too much light or heat that could possibly damage it.

While preferred embodiments of the present invention have been shown and described herein, numerous variations and alternative embodiments will occur to those skilled in the art. Accordingly, it is intended that the invention is not limited to the preferred embodiments described herein but instead limited to the tee ins of the appended claims.

What is claimed is:

1. A pair of glasses comprising:
   a front frame member containing a pair of glass or plastic lenses; and
   a pair of interchangeable ear piece members, said pair of ear piece members configured to allow toolless removal from and attachment to said front frame member;
   at least said front frame member or one or both of said ear piece members having at least one opening therein adapted for placement of decorative pin members.

2. The pair of glasses as described in claim 1 wherein said ear piece members are connected to said frame member by pin members.

3. The pair of glasses as described in claim 1 further comprising at least one pin member adapted to be positioned on one of said openings.

4. The pair of glasses as described in claim 1 wherein each of said ear piece members has a male member thereon and said frame member has at least one female member therein for mating with said male member.

5. A pair of glasses comprising;
   a front frame member containing a pair of glass or plastic lenses; and
   a pair of ear piece members;
   at least one of said front frame members or one or both of said ear piece members having at least one opening therein for placement of a decorative pin member therein;
   at least one of said frame members or one or both of said ear piece members having a UV sensitive material therein or thereon; and
   at least one pin member, said pin member having a UV sensitive material thereon or therein.

6. A kit comprising a frame member having a pair of glass or plastic lenses, at least two temple members and a plurality of pin members, at least one of said pin members having a color changeable material therein or thereon, said color changeable material altering appearance in response to exposure to temperature or light.

7. A kit comprising an eyeglass frame member having a pair of glass or plastic lenses and a plurality of eyeglass temple members, each of said temple members having a first connection member thereon and said frame member having a pair of second connection members thereon for mating with said first connection member, said temple member being interchangeable with one another, wherein a member of said frame member can select any two of said temple members to form a pair of glasses;
   wherein at least said front member or one or both of said ear piece members has a UV sensitive material therein or thereon, said UV sensitive material altering the appearance of said front frame member or one or both of said ear piece members upon exposure to UV light.

8. A kit comprising an eyeglass frame member as described in claim 7 wherein each of said first connection members comprise male members and wherein each of said second connection members comprise female members.

9. The kit comprising an eyeglass frame member as described in claim 7 further comprising pin members for securing said temple members to said frame member.

10. A pair of glasses comprising:
    a front frame member containing a pair of glass or plastic lenses; and
    a pair of interchangeable ear piece members, said pair of ear piece members configured to allow toolless removal from and attachment to said front frame member;
    at least said front frame member or one or both of said ear piece members having at least one opening therein; and
    wherein at least said front frame member or one or both of said ear piece members has a UV sensitive material therein or thereon, said UV sensitive material altering the appearance of said front frame member or one or both of said ear piece members upon exposure to UV light.

11. The pair of glasses as set forth in claim 10 wherein said ear piece members are connected to said frame member by pin members.

12. The pair of glasses as set forth in claim 10 wherein said opening is at least one of said pair of ear piece members is adapted for placement of pin members.

13. The pair of glasses as set forth in claim 10 further comprising at least one pin member adapted to be positioned on one of said openings.

14. The pair of glasses as set forth in claim 10 wherein each of said ear piece members has a male member thereon and said frame member has at least one female member therein for mating with said male member.

* * * * *